United States Patent
Stec et al.

(10) Patent No.: US 9,262,807 B2
(45) Date of Patent: *Feb. 16, 2016

(54) METHOD AND SYSTEM FOR CORRECTING A DISTORTED INPUT IMAGE

(71) Applicant: FotoNation Limited, Ballybrit, Galway (IE)

(72) Inventors: Piotr Stec, Ballybrit (IE); Alexei Pososin, Galway (IE); Mihai Constantin Munteanu, Bucharest (RO); Corneliu Zaharia, Brasov (RO)

(73) Assignee: Fotonation Limited, Ballybrit, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,771

(22) Filed: Dec. 22, 2014

(65) Prior Publication Data

US 2015/0178897 A1     Jun. 25, 2015

Related U.S. Application Data

(63) Continuation of application No. 13/541,650, filed on Jul. 3, 2012, now Pat. No. 8,928,730.

(51) Int. Cl.
*G06T 5/00* (2006.01)
*H04N 5/232* (2006.01)

(52) U.S. Cl.
CPC ............. *G06T 5/001* (2013.01); *G06T 5/006* (2013.01); *H04N 5/23229* (2013.01); *G06T 2207/20021* (2013.01); *G06T 2207/20172* (2013.01)

(58) Field of Classification Search
CPC ............ H04N 5/23238; H04N 5/2628; H04N 5/2259; G06T 3/4038; G02B 13/06

See application file for complete search history.

(56) References Cited

U.S. PATENT DOCUMENTS

| 1,906,509 | A | 5/1933 | Aschenrenner |
| 3,251,283 | A | 5/1966 | Wood |
| 3,356,002 | A | 12/1967 | Raitiere |

(Continued)

FOREIGN PATENT DOCUMENTS

JP     11-298780 A     10/1999

OTHER PUBLICATIONS

Patent Abstracts of Japan, publication No. 11-298780, publication date: Oct. 29, 1999, for Wide-Area Image-Pickup Device and Spherical Cavity Projection Device.

(Continued)

*Primary Examiner* — Sath V Perungavoor
*Assistant Examiner* — Howard D Brown, Jr.
(74) *Attorney, Agent, or Firm* — Hickman Palermo Becker Bingham LLP

(57) ABSTRACT

A method for correcting a distorted input image includes determining a local region of an image to be displayed and dividing the region into an array of rectangular tiles, each tile corresponding to a distorted tile with a non-rectangular boundary within the input image. For each tile of the local region, maximum and minimum memory address locations of successive rows of the input image sufficient to span the boundary of the distorted tile are determined. Successive rows of the distorted input from between the maximum and minimum addresses are read. Distortion of the non-rectangular portion of the distorted input image is corrected to provide a tile of a corrected output image which is stored.

21 Claims, 9 Drawing Sheets

(56) References Cited

U.S. PATENT DOCUMENTS

| | | | |
|---|---|---|---|
| 4,555,168 A | 11/1985 | Meier et al. | |
| 5,508,734 A | 4/1996 | Baker et al. | |
| 5,594,363 A * | 1/1997 | Freeman et al. | H03K 19/17736 326/39 |
| 5,850,470 A | 12/1998 | Kung et al. | |
| 6,044,181 A | 3/2000 | Szeliski et al. | |
| 6,219,099 B1 * | 4/2001 | Johnson et al. | H04N 9/12 348/383 |
| 6,222,683 B1 | 4/2001 | Hoogland et al. | |
| 6,466,254 B1 | 10/2002 | Furlan et al. | |
| 6,750,903 B1 | 6/2004 | Miyatake et al. | |
| 7,058,237 B2 | 6/2006 | Liu et al. | |
| 7,280,289 B2 | 10/2007 | Yamakawa | |
| 7,327,899 B2 | 2/2008 | Liu et al. | |
| 7,495,845 B2 | 2/2009 | Asami | |
| 7,499,638 B2 | 3/2009 | Arai et al. | |
| 7,612,946 B2 | 11/2009 | Kweon, II et al. | |
| 7,613,357 B2 | 11/2009 | Owechko et al. | |
| 7,835,071 B2 | 11/2010 | Izumi | |
| 7,843,652 B2 | 11/2010 | Asami et al. | |
| 7,929,221 B2 | 4/2011 | Ning | |
| 8,090,148 B2 | 1/2012 | Asari et al. | |
| 8,094,183 B2 | 1/2012 | Toyoda et al. | |
| 8,116,587 B2 | 2/2012 | Shoaib et al. | |
| 8,134,479 B2 | 3/2012 | Suhr et al. | |
| 8,144,033 B2 | 3/2012 | Chinomi et al. | |
| 8,212,882 B2 | 7/2012 | Florea et al. | |
| 8,264,524 B1 | 9/2012 | Davey | |
| 8,311,344 B2 | 11/2012 | Dunlop et al. | |
| 8,340,453 B1 | 12/2012 | Chen et al. | |
| 8,379,014 B2 | 2/2013 | Wiedemann et al. | |
| 8,903,468 B2 * | 12/2014 | Peyman | A61F 9/00821 600/407 |
| 2003/0002734 A1 * | 1/2003 | Islam et al. | H04N 19/63 382/166 |
| 2005/0084175 A1 * | 4/2005 | Olszak | G06T 3/4038 382/284 |
| 2006/0140449 A1 | 6/2006 | Otsuka et al. | |
| 2007/0172150 A1 | 7/2007 | Quan et al. | |
| 2008/0075352 A1 | 3/2008 | Shibuya et al. | |
| 2010/0002071 A1 * | 1/2010 | Ahiska | H04N 5/217 348/36 |
| 2010/0033551 A1 | 2/2010 | Agarwala et al. | |
| 2010/0111440 A1 | 5/2010 | Chai et al. | |
| 2010/0283868 A1 | 11/2010 | Clark et al. | |
| 2011/0216156 A1 | 9/2011 | Bigioi et al. | |
| 2012/0162454 A1 | 6/2012 | Park et al. | |
| 2012/0249725 A1 | 10/2012 | Corcoran et al. | |
| 2012/0249727 A1 * | 10/2012 | Corcoran et al. | G06T 3/0062 348/36 |
| 2012/0249841 A1 * | 10/2012 | Corcoran et al. | H04N 5/217 348/241 |
| 2013/0070126 A1 | 3/2013 | Albu | |
| 2013/0114735 A1 | 5/2013 | Wang | |
| 2013/0156279 A1 | 6/2013 | Schoenmeyer et al. | |
| 2014/0009568 A1 * | 1/2014 | Stec; Piotr | G06T 5/006 348/36 |
| 2014/0055616 A1 | 2/2014 | Corcoran et al. | |
| 2014/0063229 A1 | 3/2014 | Olsson et al. | |
| 2014/0152683 A1 | 6/2014 | Nystad et al. | |
| 2015/0262344 A1 * | 9/2015 | Stec; Piotr | G06T 5/006 382/275 |

OTHER PUBLICATIONS

Sang-Yong Lee, Jae-Tack Yoo, Yogendera Kumar, and Soo-Won Kim, Reduced Energy-Ratio Measure for Robust Autofocusing in Digital Camera, IEEE Signal Processing Letters, vol. 16; No. 2, Feb. 2009, pp. 133-136.

Jaehwan Jeon, Jinhee Lee, and Joonki Paik, Robust Focus Measure for Unsupervised Auto-Focusing Based on Optimum Discrete Cosine Transform Coefficients, IEEE Transactions on Consumer Electronics, vol. 57, No. 1, Feb. 2011, pp. 1-5.

Aaron Deever, In-Camera All-Digital Video Stabilization, ICIS '06 International Congress of Imaging Science, Final Program and Proceedings; Society for Imaging Science and Technology, pp. 190-193.

Felix Albu, Corneliu Florea, Adrian Zamfir, Alexandru Drimbarean, 10.4-3 Low Complexity GlobalMotion Estimation Techniques for Image Stabilization, IEEE, Aug. 2008, pp. 1-4244-1459.

Masahiro Watanabe, Shree K. Nayar: Short Papers Telecentric Optics for Focus Analysis, IEEE Transactions on Pattern Analysis and Machine Intelligence, vol. 19; No. 12, Dec. 1997, pp. 1360-1365.

U.S. Appl. No. 13/541,650, filed Jul. 3, 2012, entitled: Method and System for Correcting a Distorted Input Image.

A. Ben Hamza, Yun He, Hamid Krim, and Alan Willsky: A multiscale approach to pixel-level image fusion, Integrated Computer-Aided Engineering, IOS Press, No. 12,2005 pp. 135-146 CIPA DC-007-Translation-2009: Multi-Picture Format. Established on Feb. 4, 2009, prepared by Standardization Committee, published by Camera & Imaging Products Association, 61 pages.

U.S. Appl. No. 14/728,939, filed Jun. 2, 2015, Notice of Allowance, Oct. 22, 2015.

* cited by examiner

Coordinates found by the Edge Tracer

Shaded area is added by the Tile Border Extender

METHOD AND SYSTEM FOR CORRECTING A DISTORTED INPUT IMAGE

CROSS-REFERENCE TO RELATED APPLICATIONS; BENEFIT CLAIM

This application claims the benefit under 35 U.S.C. §120 as a continuation of application Ser. No. 13/541,650, filed Jul. 3, 2012, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE INVENTION

This invention relates to a method and system for correcting a distorted input image.

BACKGROUND

FIG. 1 shows an exemplary Wide Field of View (WFOV) lens system. The lens system shown includes a hemispherical field of view mapped to a planar image sensor for example as shown in FIG. 2.

This mapping can tend to result in variations in acquired image distortion and resolution across the field of view. It is desired to correct for this distortion so that, for example, features such as faces or other objects, especially those located towards the periphery of the field of view, do not appear distorted when displayed.

Separately, WFOV systems can tend to especially introduce heavy and in some cases non-uniform distortion patterns across the field of view so that acquired images (or indeed different colour planes of an acquired image) do not uniformly conform to the ideal mapping shown in FIG. 2. Thus, it is desired to also correct for this type of distortion, as well other types of optical distortion that can tend to occur within digital images.

In a high definition image acquisition device, sometimes enormous amounts of information are received and transmitted across the system bus at high frame acquisition speeds. This places pressure on many processing modules that may be connected to the system bus to ensure their demands on the system bus are within an allocated budget and so do not interfere with other processing. The processing modules themselves may be implemented in certain embodiments with a reduced or minimal hardware footprint so as to minimize device production costs.

U.S. Pat. No. 5,508,734, which is incorporated by reference, discloses a WFOV lens assembly designed to optimize the peripheral regions of the field of view to provide improved resolution matching between the peripheral region relative to a central region, the peripheral region tending to have a lower resolution than the central region.

US 2010/0111440, which is incorporated by reference, by Chai, discloses a distortion correction module which partitions coordinate points in a selected output image into tiles. The output image is an undistorted rendition of a subset of the lens-distorted image. Coordinate points on a border of the tiles in the output image are selected. For each tile, coordinate points in the lens-distorted image corresponding to each selected coordinate point in the output image are calculated. In addition, for each tile, a bounding box on the lens-distorted image is selected. The bounding box includes the calculated coordinates in the lens-distorted image. The bounding boxes are expanded so that they encompass all coordinate points in the lens-distorted image that map to all coordinate points in their respective corresponding tiles. Output pixel values are generated for each tile from pixel values in their corresponding expanded bounding boxes.

BRIEF DESCRIPTION OF THE DRAWINGS

Embodiments are described below, by way of example, with reference to the accompanying drawings, in which.

DETAILED DESCRIPTION OF THE EMBODIMENTS

Figure 3:
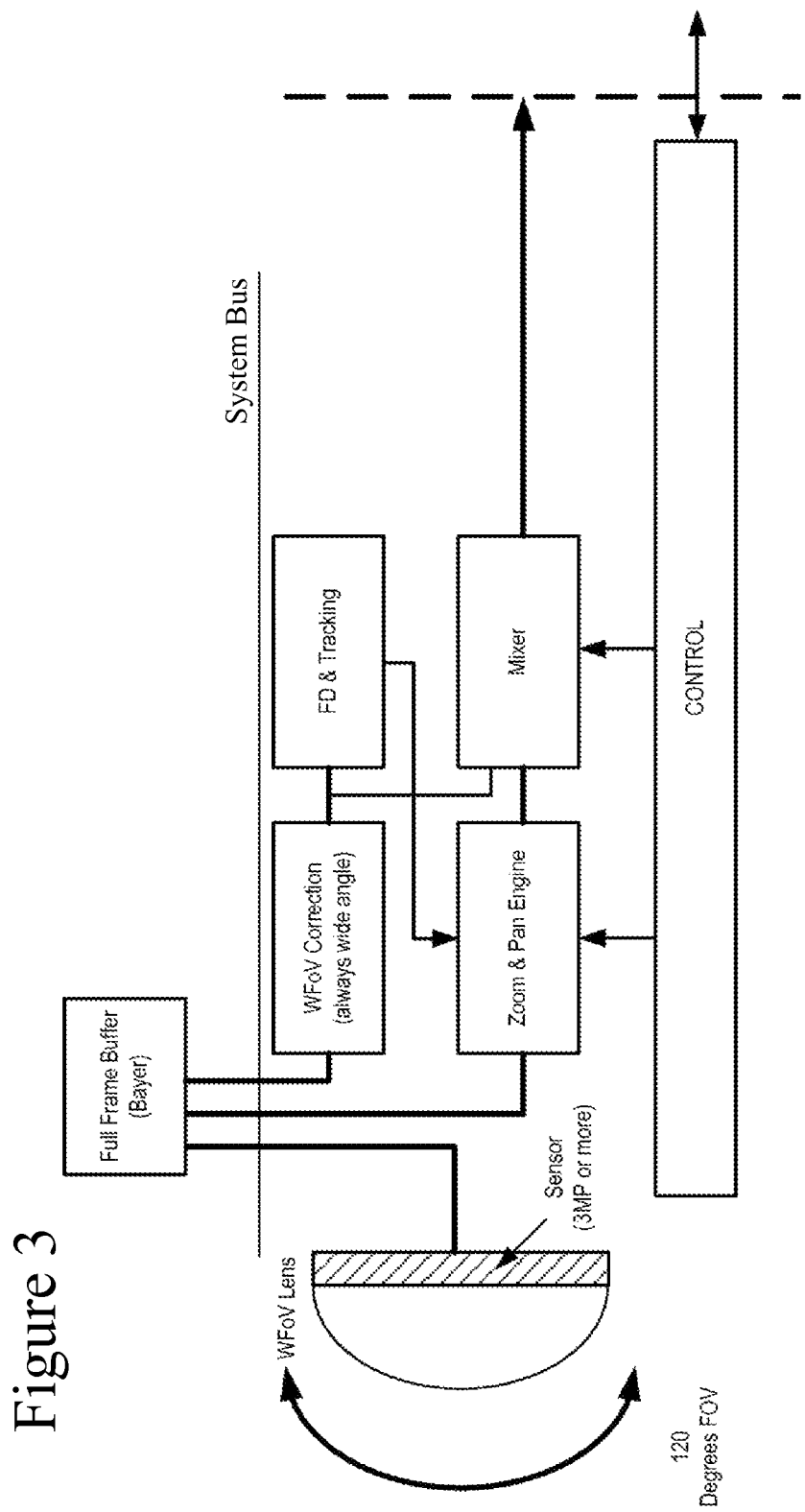
FIG. 3 illustrates schematically a digital image acquisition device for acquiring and processing a succession of images in accordance with certain embodiments.

Referring to FIG. 3 for illustration of one example embodiment, US published patent application 2011/0216156 and U.S. application Ser. No. 13/077,891 (Ref: FN-369A-US), Ser. No. 13/078,970 and Ser. No. 13/084,340, which are assigned to the same assignee and hereby incorporated by reference, disclose digital image acquisition devices including WFOV lens systems. In certain embodiments, distorted WFOV images are read from a sensor via an imaging pipeline which is configured to carry out pre-processing of an image before being read across a system bus into system memory.

Such systems can employ hardware modules or sub-modules also connected directly or indirectly to the system bus for reading successive images stored in system memory from the bus and for processing the image before either returning the processed image to system memory or forwarding the processed image for further processing. The WFOV correction module illustrated by example in FIG. 3 is configured to successively read distorted images or image portions and provide corrected images or image portions to a face detection (FD) and/or tracking module.

In certain embodiments, a system controller controls various hardware modules responsive to, for example, commands received through a control interface from, in certain embodiments, software applications running on the device with which a user may interact. In the example embodiment illustrated in FIG. 3, a zoom and pan module is connected to the controller and this in turn communicates with the WFOV correction module to determine which part of an acquired image will be read from system memory for correction and, for example, displayed on a device viewfinder (not shown) and/or forwarded to the face detection module. In certain embodiments, a mixer module, for example, superimposes boundaries around the faces or other objects which have been detected and/or tracked for display on the device viewfinder.

Part of a correction module footprint in accordance with certain embodiments is cache memory. On the one hand, it may be desirable in certain embodiments to minimize cache size to minimize device cost, yet on the other hand, it may be desirable in certain embodiments to minimize I/O access by hardware modules across the system bus. In certain embodiments, multiple forms of distortion are advantageously corrected, without successively reading from, correcting and writing back to memory an image for each form of distortion to be corrected.

Separately, WFOV lens systems, as well as being incorporated in certain embodiments into hand-held digital image acquisition devices, can be included in other embodiments in devices with various specialist applications, for example, fixed security cameras. In some cases, for example, an overhead camera mounted towards a centre of a ceiling in a room includes in certain embodiments a lens system which is configured to primarily emphasize the circumferential field of view of the room while acquiring relatively little detail in the region immediately below the camera.

When a person walks across such a room, he or she initially moves closer to the camera, but the angle of incidence of his or her face to the camera means the camera view of the face becomes less frontal possibly making it more difficult for the camera to track and/or recognise the person's face. In certain embodiments, in addition to correcting for the distortion introduced by non-linear mapping of the circumferential view of the room onto the planar surface of the acquisition system imaging sensor, advantageous techniques and configurations are provided to adjust either the sensor or the lens angle to improve the view of a target person.

Figure 1:
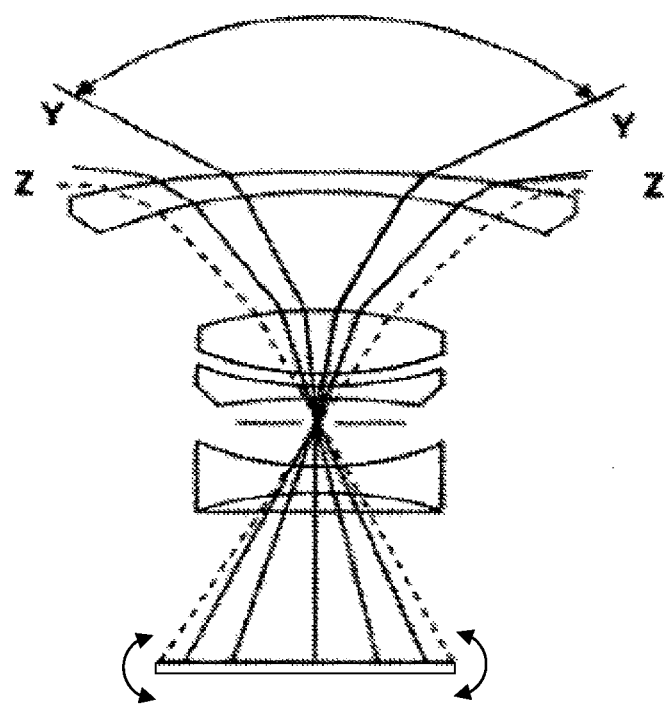
FIG. 1 illustrates schematically a conventional WFOV lens system.

Depending on the nature of the lens assembly, it may be preferable to tilt the lens, rather than the sensor. However, if the lens arrangement includes a large optical assembly, for example, for providing long-range optical quality for security applications, then it could also be desirable to tilt the image sensor assembly, as indicated by the arrows of FIG. 1, to optimize the view of a person's face as they approach the camera. This tilting of the sensor in certain embodiments introduces additional distortion into the image beyond that associated with, for example, a non-linear optical structure of the lens.

As a person approaches a camera, images acquired by the camera of his or her face will tend to become elongated towards the chin and bulbous towards the top of the head. Certain embodiments include advantageous techniques and/or configurations to counter this non-linear distortion of the person's face.

Several different distortions tend to occur in images of a person as he or she walks across a field of view (FOV) towards the lens assembly of a camera, including: (i) a non-linear lens distortion which can be a function of the location within the FOV of the lens; (ii) distortion due to possible relative movement of the lens and sensor surfaces; and (iii) distortion effects in local areas such as faces which vary according to both the vertical and horizontal distance from the camera unit.

Other distortions such as "rolling shutter" distortion can be caused by movement within the field of view while an image is being read from a sensor, such that, without correcting for this distortion, portions of an image can appear wrongly shifted relative to others.

In applications where it may be desirable to flip an acquired image before it is displayed, this can result in distortion and/or be considered as a form of distortion.

In techniques in accordance with certain embodiments, a locally uniform image frame is obtained by dynamically adjusting a mapping between an image sensor surface and rectangular grid regions within a desired view to be presented on a display or otherwise stored for viewing. This mapping can change from frame to frame and indeed within a frame in certain embodiments, and is driven both by the relative position of a moving target relative to the image acquisition device as well as through user interaction with a camera application, for example, determining a size of a region of interest (ROI) within a field of view and/or zooming in on a field of view.

A distortion adjusting engine is provided in certain embodiments which copes with multiple sources of distortion and which can dynamically adjust the overall mapping of pixels from the sensor surface to generate a final rectilinear grid of display pixels on an output display and/or for storing or compressing into a selected video format.

Certain embodiments are particularly useful in and/or configured for security monitoring and/or for monitoring of loved ones, e.g., stay-at-home elderly persons or children.

Figure 4:
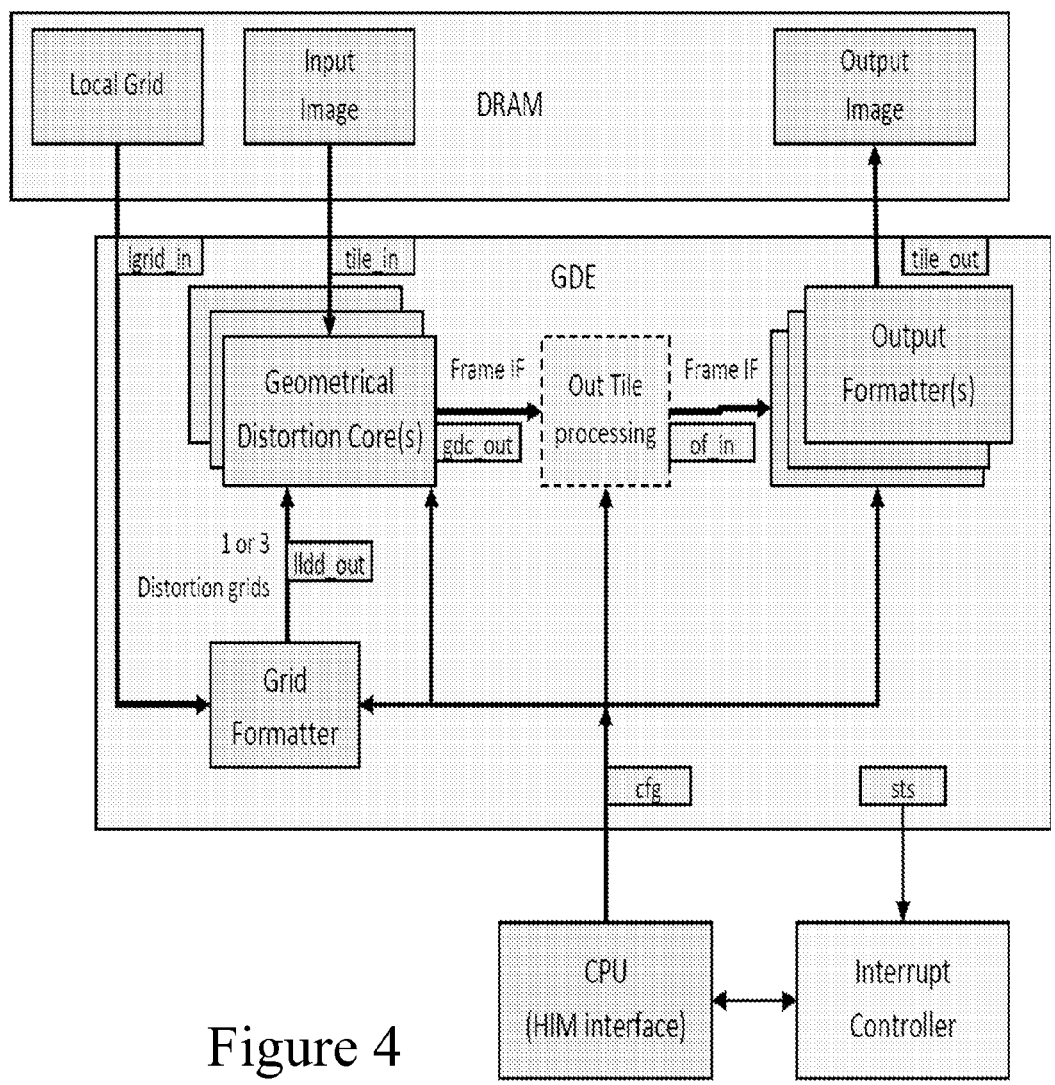
FIG. 4 illustrates schematically a geometrical distortion engine (GDE) according to an embodiment.

A basic structure of an engine for handling geometrical distortion within images in a digital image acquisition device according to an embodiment is illustrated by the example provided in FIG. 4. As will be explained in detail below, the Geometrical Distortion Engine (GDE) is capable of effectively removing distortions introduced by, for example, a WFOV lens system. In addition, the GDE illustrated at FIG. 4 may be utilized and/or configured for compensating for distortion caused by camera shake. The GDE of FIG. 4 may also be utilized and/or configured for correcting distortion introduced by a device user through interaction with an application running on or in communication with the acquisition device. Such user-defined distortion may include in certain embodiments an affine transformation, colour transformation and/or image morphing to apply particular effects to the image and indeed sequence of images being acquired by the device.

In certain embodiments, distortion processing on each color plane of an image, for example RGB, YUV or LAB, is performed independently of the others. Accordingly, a GDE for this system may be configured to include a geometrical distortion core (GDC) that is configured to process each color plane separately, so providing greater flexibility at the system level. A single GDC can be configured to process each color plane sequentially, or multiple GDCs (such as the example illustrated at FIG. 4) can process multiple planes of an image separately and/or at the same time.

A grid as used herein may include an array of tiles. Each tile may be defined by its vertices, e.g., the four corners of a rectangular tile, and these may be referred to as nodes. A transformation maps the coordinates of nodes within a grid according to a given distortion to be corrected.

The GDC is configured in certain embodiments to process an input image plane tile by tile under the control of a Grid Formatter Unit (GFU). The GDC fetches input tiles (tile_in) from the DRAM according to the addresses provided by the GFU and processes them, producing the corrected pixels for respective output tiles (gdc_out) in normal raster order.

While information for each distorted tile of the input image may in certain embodiments be read in rectangular blocks from DRAM, each rectangular block bounding a distorted tile, for a heavily distorted input image tile, this can mean reading quite a lot of information from DRAM across the system bus that is not used in mapping the distorted input image tile (tile_in) to the output image tile (gdc_out). In other embodiments, information not used for correcting a given distorted tile is not read from memory into a tile cache (see FIG. 8) of the GDC. In other words, a higher percentage of information that is read from the memory into the tile cache is involved in the correcting of each given distorted tile. In one embodiment, only the information required for correcting a given distorted tile of the input image is read from memory into the tile cache of the GDC. Thus, the nodes defined for each tile to be read from DRAM generally define a polygon which in turn is used to determine the image information read from DRAM for a tile.

In certain embodiments, the distortion function applied by the GDC to each tile may be governed by more than its role in correcting for WFOV lens system distortion. Other distortion effects can be involved such as distortion from camera shake, user defined distortion and/or lens-sensor misalignment (sensor tilt).

As will be described in more detail in relation to FIG. 6, the GFU combines in certain embodiments local grid information taken from DRAM, an affine transformation matrix and global grid information, and may also produce Low Level Distortion Descriptors (LLDD) for each tile of the grid from within a sensed image which is to be processed by the GDE or each GDC. These descriptors may be employed by the GDE or each GDC to read correct image tile information from memory and to correct the image tile.

In the present description, a Local Grid may relate to an area of interest within a field of view where the image is to be corrected, for example, for subsequent display. So for example, if in an image stream, a face detector (FD) such as that illustrated in FIG. 3, is configured to detect a face region within a field of view, an application fed from the FD may be configured in certain embodiments to decide that a region, e.g., having polygonal shape such as that of a rectangle, bounding this face represents a region of interest. The coordinates defining this region are then written to a "Local Grid" region of DRAM and this region will be processed by the GDE. Thus, in this embodiment, for a given frame, at least one Local Grid is stored in memory defining a region of the field of view which is to be corrected. As a face moves across the field of view of the camera, the Local Grid can be shifted from frame to frame. Equally, if more than one face is detected, more than one Local Grid may be stored in memory and each Local Grid may be processed by the GDE in turn. As such, the description of the processing of each Local Grid can be treated independently.

The corrected grids of the complete image could for example be displayed superimposed over the remaining portions of the image, so that for example faces which are detected at the extreme edges of the field of view of a WFOV lens system can be displayed undistorted.

The Affine Transformation enables the GDC to correct either, for example, for movement from frame to frame or indeed to compensate for changes or misalignment between lens and image sensor (Global Affine); or for example, distortion caused by rolling shutter (Local Affine). Thus, in the case of local affine transformation, the mapping of node locations from one portion of the Local Grid of an input image to the output image could be different from the mapping from another portion of the Local Grid. This may be implemented by specifying sequences of nodes for which given transformations apply.

Figure 2:
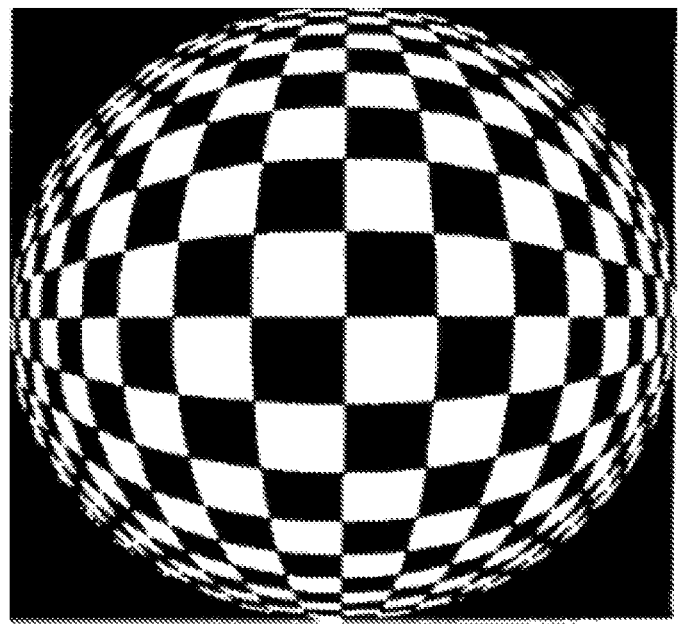
FIG. 2 illustrates a notional distortion pattern introduced by a conventional WFOV lens system.

The Global Transformation is in general fixed for a given lens. For a typical WFOV lens, the transformation takes into account the deviation caused by a given lens away from a nominal mapping of field of view to an image sensor such as that illustrated in FIG. 2. For a zoom lens, the Global Transformation may be fixed for a given focal length. For a lens such as may be configured for use within a security camera, where the image sensor can rotate relative to the lens system, the Global Transformation may be fixed for a given angle of the image sensor to the lens system. This mapping is certain embodiments stored within the GFU, where it may be only rarely updated or, except in the case of a zoom lens, it may be at least unlikely to be updated on a real-time frame-by-frame basis as an image stream is captured.

Referring back to FIG. 4, an output formatter is configured in certain embodiments to take corrected image tiles (of_in) and write these into Output Images in bursts back to the DRAM memory.

Extra "Out Tile" processing blocks can be inserted in certain embodiments between the GDC and the output formatter. In certain embodiments, the output format of each GDC is in a standard frame format, e.g., so that each tile output by the GDC can be treated as a separate image, meaning that a "Out Tile" processing block that has a frame interface input/output can be inserted between the GDC and output formatter. The extra processing blocks can be blocks that process a pixel deep image stream, for example, gamma correction, colour enhancement and/or high dynamic range processing. They can also be blocks where a second image source is used, for example, for alpha blending.

Figure 5:
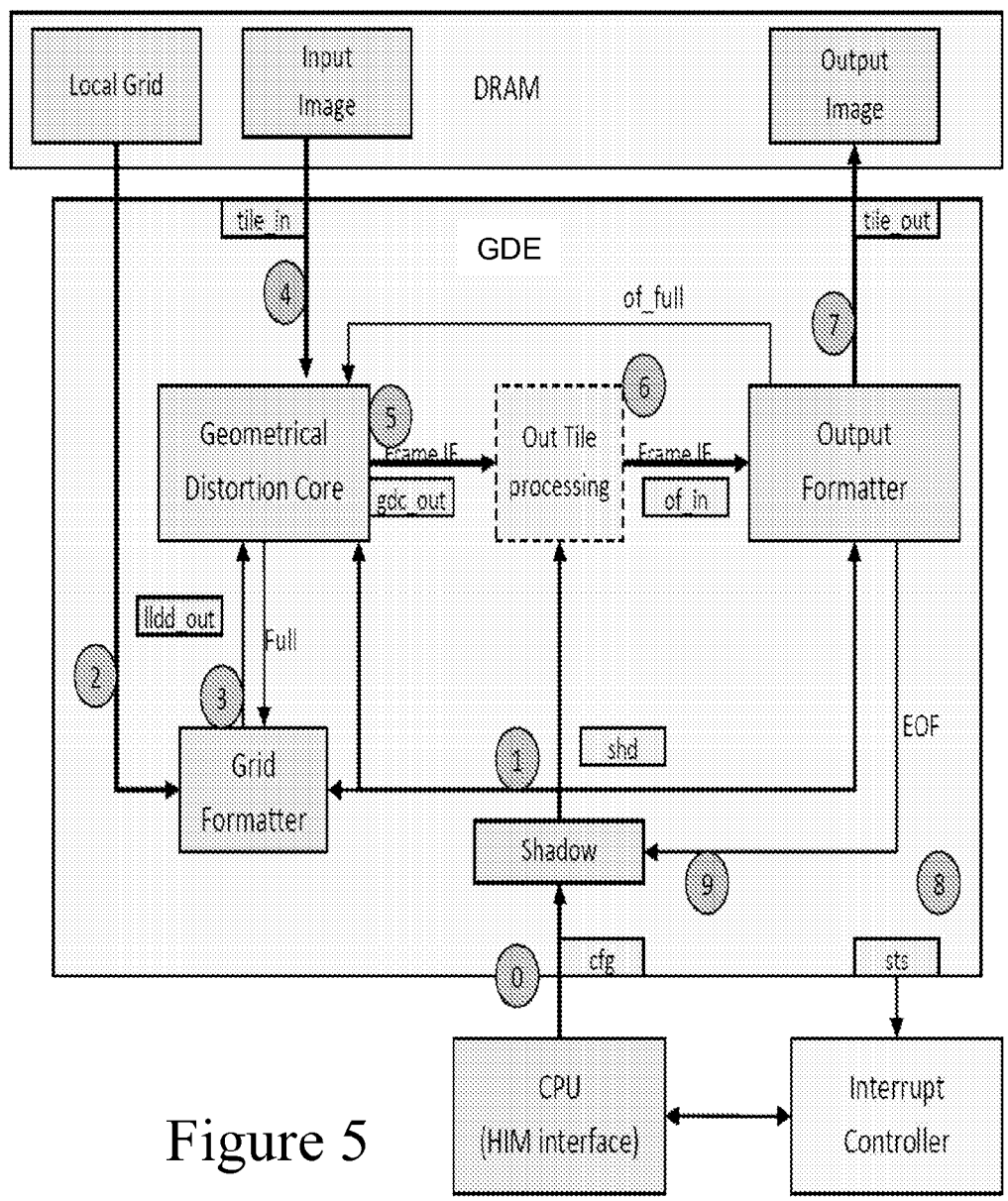
FIG. 5 illustrates data flow within the GDE of FIG. 4.

Referring now to FIG. 5, the operation of a GDE in accordance with certain embodiments is described in an example process for a given image plane:

0 The CPU programs the GFU and the other blocks.

1 When the GDE block is enabled, the configuration from the CPU is copied into internal shadow registers via the cfg interface. The main purpose of the shadow registers bank is to provide constant configuration inputs to the internal GDE blocks during processing of a given image frame while allowing the CPU to prepare the configuration for the next image frame. As such the contents of the shadow registers are in general stable for the whole processing time of a frame.

Figure 6:
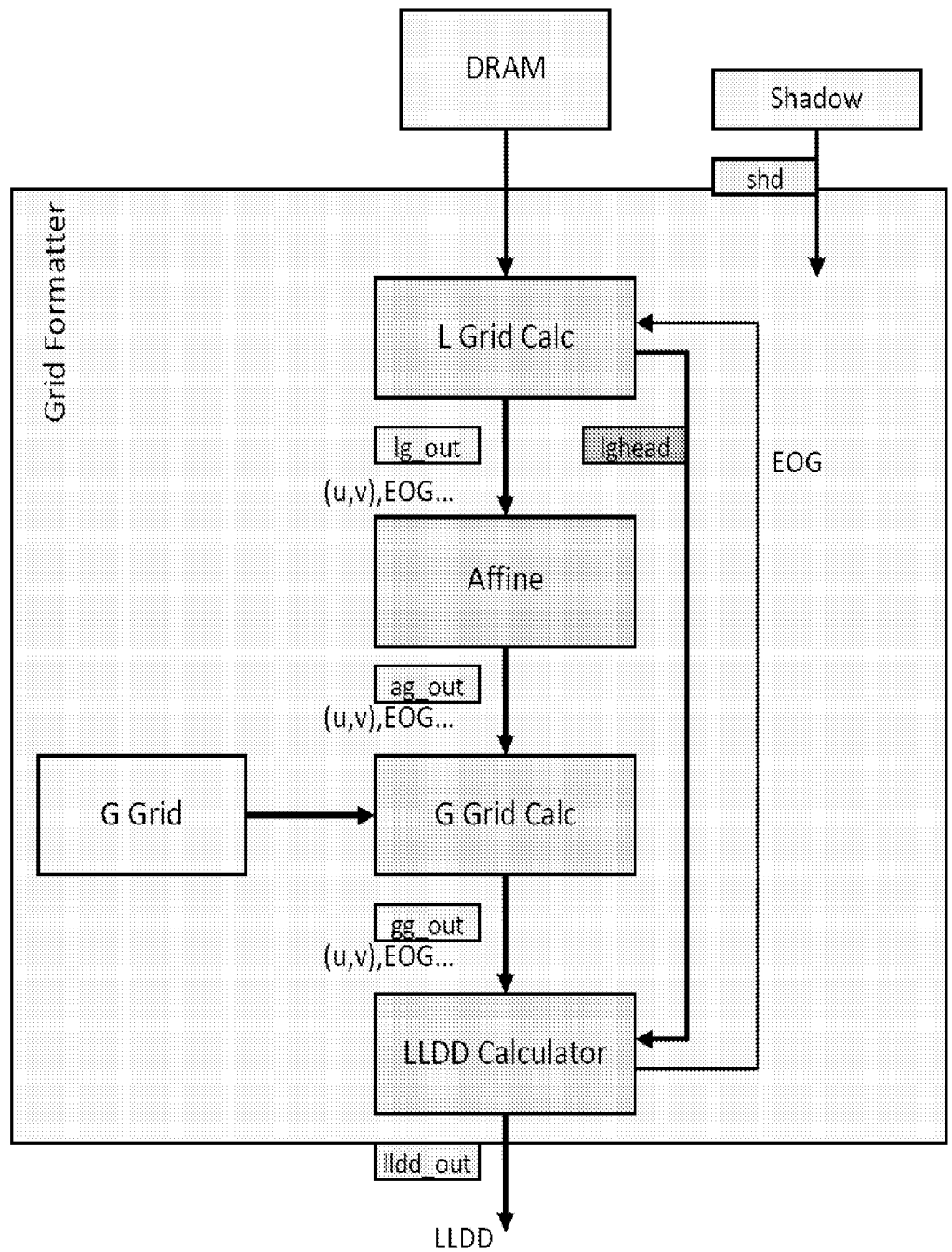
FIG. 6 illustrates the structure of the Grid Formatter (GFU) of FIG. 4.
Figure 7A:
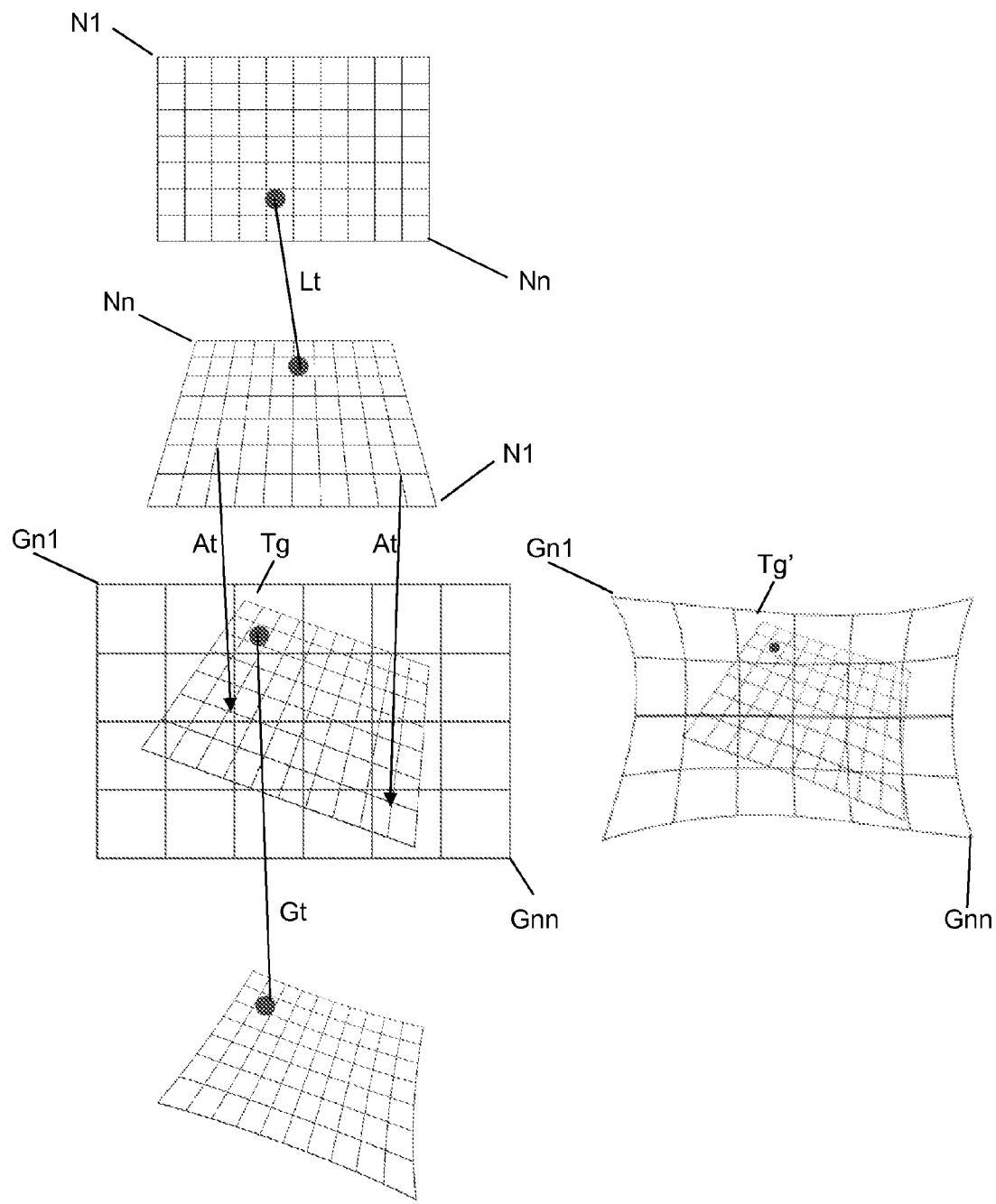
FIG. 7(a) illustrates tile transformation.

2 Referring to FIG. 6, the GFU fetches a local grid header from the DRAM. The header contains information about local grid location in the output image space, grid dimension expressed in number of nodes, and the single cell (tile) size. The output image grid is rectangular in this example and so this information is enough to describe the whole local grid in the output image space. The header is followed by the nodes containing coordinates in the input image space and variations in those coordinates describe the distortion associated with the local grid. So referring to the example of FIG. 7(a), the local grid transformation (Lt) defines for each node of the Local Grid, the change in node coordinate information. In the example of FIG. 7(a), the local grid comprising nodes N1 . . . Nn undergoes a flip and perspective transformation and so could compensate for varying rotation of the image sensor relative to the lens assembly such as illustrated in FIG. 1 as well as for simulating or compensating for a mirror view. So we can see node N1 moves from the top left to the bottom right and vice versa with node Nn, and that the transformed top of the local grid becomes more compressed than the bottom. The effect of the local grid transformation on the geometry and location of a specific tile is also illustrated.

Also, the local grid transformation can compensate for varying distortion caused by changes in perspective for different local regions within an input image—particularly in the case of WFOV systems. Thus, the local grid can help to compensate for the greater degree of distortion found in faces at the edge of a wide field of view vis-à-vis those located (or detected) at the centre of the field of view.

Values from the local grid header are used by L Grid Calc to setup registers responsible for accessing the local grid information from DRAM. After this, the GFU starts to read local grid node coefficients from DRAM one by one. The transformed coordinates for the grid nodes are then passed to an Affine block (if enabled). In the embodiment, the Affine block multiplies input node coordinates u,v by a 2×3 matrix comprising coefficients a1 ... a6 of the Affine Transformation (At) in order to produce output coordinate values u',v':

$$\begin{bmatrix} u' \\ v' \end{bmatrix} = \begin{bmatrix} a1 & a2 \\ a3 & a4 \end{bmatrix} \begin{bmatrix} u \\ v \end{bmatrix} + \begin{bmatrix} a5 \\ a6 \end{bmatrix}$$

The values of those matrix coefficients a1 ... a6 are stored in the registers internal to the GFU. These internal GFU registers holding coefficient values can be programmed two-fold: in a first mode, Global Affine Transform mentioned above, they can be programmed by the CPU before the start of the frame processing and their values are kept constant for all local grids of a whole frame; and in the second mode, Local Affine Transform, values of the shadow registers are read from DRAM together with a node index that indicates when a new set of affine transformation coefficients must be loaded. For example, if a first set of node coefficients is loaded together with an index 100, this transform is applied to the nodes 0 to 99 and before node 100 is processed a new set of transformation coefficients is loaded from DRAM and applied to the subsequent nodes until the next change is indicated. As mentioned above, the second mode allows for dynamic transformation updates and correction for example, of rolling shutter distortions together with camera shake compensation. Thus, it will be seen that in this example, the Affine Transformation comprises a formulaic transformation of node coordinate locations from the local transformation (Lt). In the present example show in FIG. 7(a), the affine transformation (At) comprises a global affine transformation rotating the entire grid and so could compensate for a rotational misalignment in a plane parallel to the plane of the image sensor between lens and image sensor.

The coordinates that are produced by the Affine block of FIG. 6 are then passed to the global correction block G Grid Calc. This block applies warping distortion to the input local and/or affine transformed node coordinates with the distortion defined by means of a regular grid of nodes (G in FIG. 7(a)) with nodes distributed regularly in the input coordinates space and the values stored in the nodes point to locations on the sensor image space. This provides mapping from the regular to distorted coordinate system with intermediate coordinate values (not belonging to the grid nodes) obtained using bi-cubic interpolation. The values of the coordinates of the global grid nodes are stored in the internal registers and can be updated after the end of each frame to allow for dynamic changes to the correction for lens distortion involved in an embodiment including a zoom lens where distortion changes shape with change of the focal length. The final node coordinate values from the global transformation are passed to the LLDD Calculator input queue.

Again referring to the example of FIG. 7(a), the global transformation (Gt) comprises a mapping of node coordinates Gn1 to Gnn of a Global Grid for example to take into account lens distortion. For a given node coordinate after Affine Transformation (At) and or Local Grid transformation (Lt), G Grid Calc finds the nodes of the Global Grid surrounding that location and interpolates the mapping of those nodes of the Global Grid tile to the node of the local and/or affine transformed node of the local grid to determine the Global Transform (Gt) of that node location.

In the example illustrated at FIG. 7(a), for nodes within the tile Tg of the global grid, the mapping of the coordinates of the tile Tg to the transformed file Tg' is interpolated and applied in certain embodiments to local and/or affine transformed node coefficients to finalise the transformation of the original node coordinates. Thus for a node N, the complete transformation becomes Gt(At(Lt(N))).

When an LLDD Calculator in accordance with certain embodiments input queue contains a number of nodes equal to grid width+2 (a full tile), it uses them to prepare an LLDD descriptor that contains a full definition of the input tile. The definition contains location of the tile on the sensor image and partial differences that will be used by an address calculator (see, e.g., FIG. 8) to calculate locations of pixels belonging to this particular tile. The complete LLDD descriptors are loaded to the LLDD FIFO (lldd_out).

3 Referring back to FIG. 5, the GFU fills the LLDD FIFO of the GDC with descriptor data for each tile to be processed.

4 The GDC fetches the input image tile by tile, with a new tile for every LLDD FIFO entry.

5 The GDC processes each tile and outputs the corrected tiles in frame interface format. A backpressure signal path from the output formatter to the GFU enables the GFU to stall the GDC if the output formatter is full.

6 Optional processing algorithms can be applied on the GDC corrected tiles.

7 The output formatter writes the corrected tiles (tile_out) of the output image into the memory.

8 When processing of a given Local Grid tile is completed and when the frame is completed, the output formatter signals this using an interrupt signal provided through a status interface (sts) to an interrupt controller.

9 If the GDE is still enabled when the frame is completed (EOF), the shadow register values are updated for the next frame.

Referring to FIG. 6, as indicated above, the GFU in this example combines basic local grid information obtained by the L Grid Calc block from DRAM, affine transformation matrix and the global distortion grid information stored within the block G Grid and obtained from the Shadow Registers and generates the LLDD descriptor information for each tile.

When the GFU is enabled, an L Grid Calc block in accordance with certain embodiments starts reading the local distortion grid (defining Lt in FIG. 7(a)) from the Local Grid information in DRAM. A frame includes at least one local grid, unless whatever application is running in the acquisition device has determined that there is no particular region of interest where distortion correction is to be applied, such as for example, when no faces or other objects of interest have been detected or are being tracked. Multiple local grids may be stored one after another in the memory. A local grid may include a header followed by the nodes of the grid that contain point coordinates in the distorted image space.

An Affine transformation block in accordance with certain embodiments applies a user defined affine transformation (see, e.g., At in FIG. 7(a)) to the (u, v) coordinates produced by the L Grid Calc block. The Affine block performs an affine transformation on the (u,v) coordinates from the L Grid Calc block. As described at step 2 above, the Affine block in this illustrative, non-limiting example has two operating modes where a) the affine coefficients are taken from the internal GFU registers corresponding to the shadow registers meaning that they are constant through the frame; and b) the coefficients are taken from the internal GFU registers and can change during the frame.

A G Grid calculation block according to certain embodiments calculates the final distorted grid including performing spline interpolation based on the global grid points (see, e.g., Gn in FIG. 7(a)) obtained from G Grid.

When reading the last node of the last tile of the current local grid, L Grid Calc asserts an End of Grid (EOG) flag. The grid coordinates in input space (u,v) and output space (x,y) together with the EOG flag are sent to the next block in the pipe—in this example Affine. The next blocks in the pipe (Affine, Global Grid calculation) may use the same interface, meaning that the Affine or the Global Grid Calculator blocks can be swapped or removed from the pipeline. The (u,v) coordinate may be processed by the Affine and Global Grid calculator. Other image fields in the header are passed down the pipeline unchanged.

The final distortion descriptors for each tile of the grid are calculated by an LLDD Calculator. The LLDD Calculator block combines the header information provided on an lghead interface in certain embodiments with the descriptor fields, and sends them on a lldd_out interface. The L Grid Calc block does not start processing a new grid in this example until the LLDD Calculator block signals with an EOG signal that the last tile of the current grid is processed. This ensures that the signals on the lghead interface are constant for all tiles of a local grid.

Figure 7B:
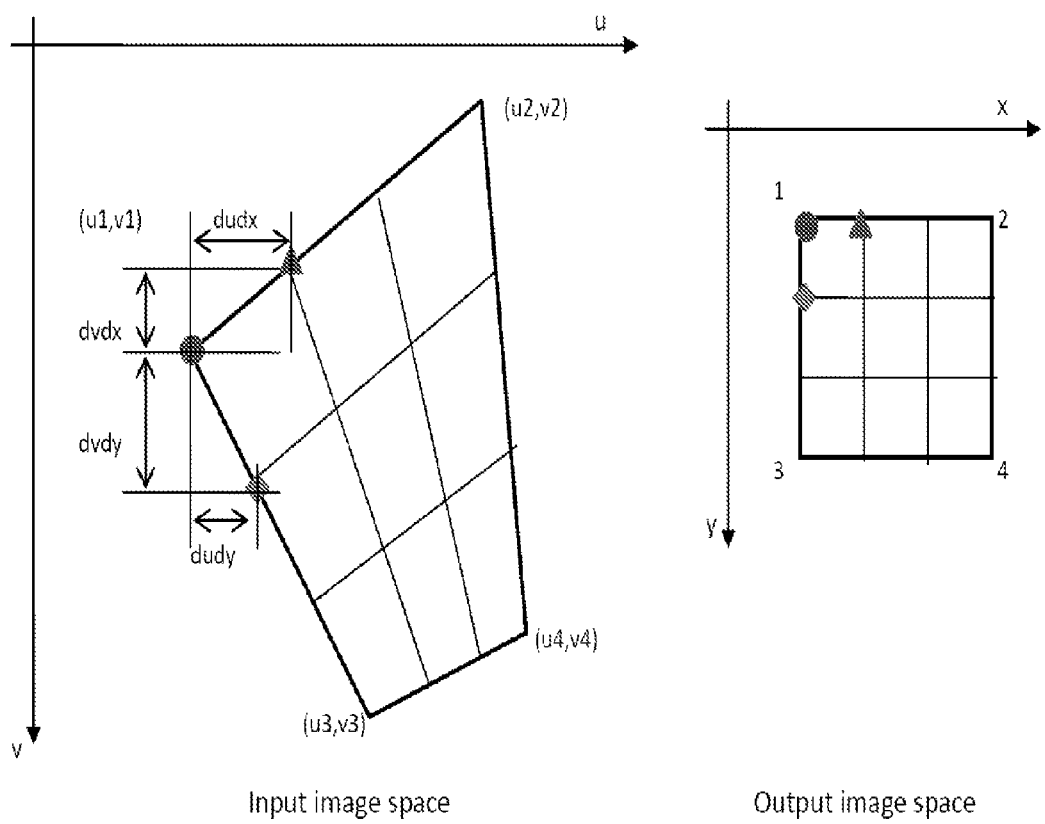
FIG. 7(b) illustrates an example of a tile transformed according to an embodiment.

FIG. 7(b) shows a tile in the output (right) and the input (left) image space. For exemplary purposes, the tile contains 4×4 pixels. The LLDD Calculator gets the coordinates of the four corners (u1,v1) to (u4,v4) and calculates the partial differences (dudx, dvdx, etc) needed by an addresser within the GDC for the linear interpolation of each of one or more sets of pixel (u,v) coordinates. As indicated above, knowing the various transformations that may be used to compensate for camera movement and user determined distortion, the LLD calculator in certain embodiments can determine an area of input image space defined by (u1,v1) . . . (u4,v4) to bounded output image space defined by nodes 1, 2, 3, 4.

When interpolating input image data to calculate output image values, data may be used for points outside the boundary defined by the vertices (u1,v1) . . . (u4,v4).

The LLDD Calculator could therefore be used to determine the memory addresses corresponding to the tile border and to extend the memory addresses around this border for each tile using, for example, a variation of Bresenham's line algorithm.

Figure 7C:
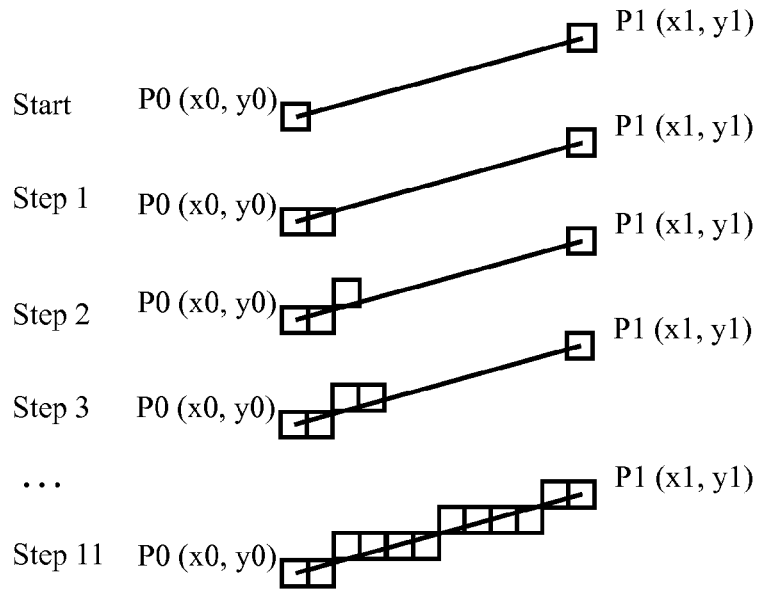
FIG. 7(c) illustrates an example of Bresenham's line algorithm for determining pixels lying along the border of a tile.

FIG. 7(c) shows an example of the steps performed by an LLDD Calculator module in accordance with certain embodiments. Here, the module takes the first and last point of each edge (u1,v1 and u2,v2; u2,v2 and u4,v4 etc) and computes (one by one) the coordinates of the pixels located on the line that is described by those 2 points.

Figure 7D:
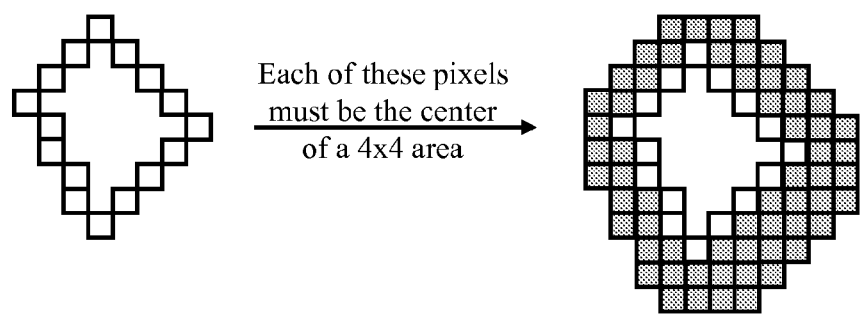
FIG. 7(d) illustrates how a tile border produced using the algorithm of FIG. 7(b) is extended.

Each of one or more sets of edge (x,y) coordinates is analyzed and the minimum and maximum x coordinates of each line in DRAM from which tile information is to be read by the GDC are stored in respective memories Max and Min. The y coordinate represents the memory address. After an edge tracer within LLDD Calculator finishes all 4 edges of a tile, it sends a ready indication to a tile border extender module within LLDD Calculator. This extender module extends the start/end coordinates produced by the edge tracer. The extension is used in this embodiment, wherein a 4 pixel×4 pixel area around each pixel and the coordinates computed by the edge tracer are changed to include all the pixels to be used. The extender module reads the 2 memories Max and Min and determines the final start/end coordinates of the pixels of each line of the tile as illustrated in the example shown in FIG. 7(d).

Thus, the above LLDD Calculator takes transformed node coordinates for a tile provided by G Grid Calc (or indeed any of one or more of the previous transformations) and provides non-rectangular strips of memory addresses running from Min to Max for each line of the input image for a tile to be read from memory by the GDC when correcting the input image.

In an alternative implementation, rather than providing the actual memory addresses to be read by the GDC, an LLDD Calculator in certain embodiments provides the tile descriptor information illustrated in FIG. 7(b). The tracing/extending functionality described above for converting this descriptor information to memory addresses may be implemented within the GDC, e.g., as set forth below.

Figure 8:
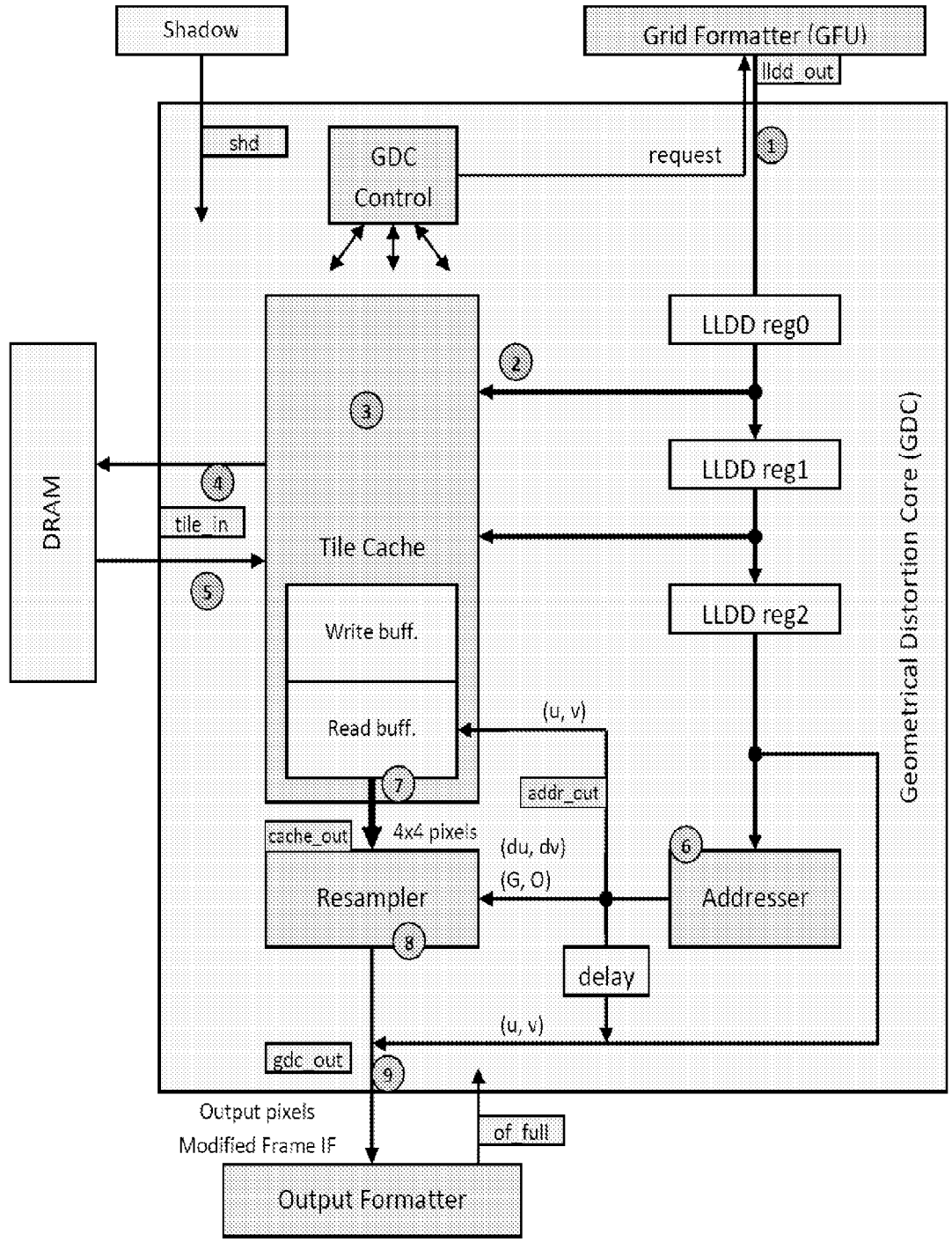
FIG. 8 illustrates the structure of a Geometrical Distortion Core (GDC) of FIG. 4.

FIG. 8 illustrates a block diagram of a Geometrical Distortion Core (GDC) in accordance with certain embodiments. Sub-blocks of the GDC may include:

Geometric Distortion Core (GDC) Control—the main control sub-block

LLDD Registers—Low Level Distortion Description Registers. Each time the LLDD for a new tile is requested from the GFU, these registers are shifted. There are two such registers as there can be data for up to three tiles in the pipe at one time.

Tile Cache—a double buffered cache which contains a Burst Calculation module (not shown) which calculates burst accesses to fill the tile cache and load the cache with data from the DRAM.

Addresser—for each pixel in the output tile (in raster order), the Addresser calculates:
coordinates of the 4 pixel×4 pixel window from the Tile cache
sub-pixels (dx,dy) for the Resampler
color offset and gain for the resampler output
Resampler—a bicubic resampler which produces an interpolated pixel value from a 4×4 pixel input.

Referring to the steps indicated in the illustrative example of FIG. 8, the GDC may operate in accordance with the following operations to prepare input tile and load to Tile Cache:

1 The GDC control block requests a new distortion descriptor LLDD for a tile. In this example, it is assumed that LLDD Calculator provides descriptor information as shown in FIG. 7(b) from the GFU and memory addresses are calculated by the Tile Cache;

2 Once the pipeline allows a new tile to be prepared, the Burst Calculation module within the tile cache starts working on the LLDD descriptor data from the GFU;

3 The Burst Calculation module calculates one by one the burst requests for the tile;

4 The Burst Calculation module requests the burst data from the DRAM based on LLDD information;

5 The Burst data is received from the DRAM and written to the Tile cache.

Process Tile:

6 For each output tile pixel, the addresser calculates the address of each 4 pixel×4 pixel block and the parameters for the Resampler 7 The 4×4 pixels window is fetched from the Tile Cache 8 The Resampler calculates the resampled output pixel 9. The signals for the gdc_out interface are assembled together in this example. It contains:
pixel data from the Resampler
Frame control signals from the addresser
Tile control signals from the LLDD FIFO
Output local grid information from the lghead register An efficient mechanism is provided in certain embodiments for performing complex distortion compensation on an input image in a processor and memory in an efficient manner with relatively low or even minimal demands on the system bus.

Advantageous correction modules are provided herein to address distortion problems in images captured by various types of digital image acquisition devices including digital still cameras, video cameras, camera-phones, camera modules, web cameras, and other camera-enabled devices. All references cited herein are incorporated by reference, including the following as describing camera devices and features in accordance with alternative embodiments:

U.S. Pat. Nos. 7,224,056, 7,683,468, 7,936,062, 7,935,568, 7,927,070, 7,858,445, 7,807,508, 7,569,424, 7,449,779, 7,443,597, 7,768,574, 7,593,636, 7,566,853, 8,005,268, 8,014,662, 8,090,252, 8,004,780, 8,119,516, 7,920,163, 7,747,155, 7,368,695, 7,095,054, 6,888,168, 6,583,444, and 5,882,221, and US published patent applications nos. 2012/0063761, 2011/0317013, 2011/0255182, 2011/0274423, 2010/0053407, 2009/0212381, 2009/0023249, 2008/0296717, 2008/0099907, 2008/0099900, 2008/0029879, 2007/0190747, 2007/0190691, 2007/0145564, 2007/0138644, 2007/0096312, 2007/0096311, 2007/0096295, 2005/0095835, 2005/0087861, 2005/0085016, 2005/0082654, 2005/0082653, 2005/0067688, and U.S. patent application No. 61/609,293, and PCT applications nos. PCT/US12/24018 and PCT/US12/25758.

Components of MEMS actuators in accordance with alternative embodiments are described at U.S. Pat. Nos. 7,972,070, 8,014,662, 8,090,252, 8,004,780, 7,747,155, 7,990,628, 7,660,056, 7,869,701, 7,844,172, 7,832,948, 7,729,601, 7,787,198, 7,515,362, 7,697,831, 7,663,817, 7,769,284, 7,545,591, 7,792,421, 7,693,408, 7,697,834, 7,359,131, 7,785,023, 7,702,226, 7,769,281, 7,697,829, 7,560,679, 7,565,070, 7,570,882, 7,838,322, 7,359,130, 7,345,827, 7,813,634, 7,555,210, 7,646,969, 7,403,344, 7,495,852, 7,729,603, 7,477,400, 7,583,006, 7,477,842, 7,663,289, 7,266,272, 7,113,688, 7,640,803, 6,934,087, 6,850,675, 6,661,962, 6,738,177 and 6,516,109; and at US published patent applications nos. 2010/030843, 2007/0052132, 2011/0317013, 2011/0255182, 2011/0274423, and U.S. unpublished patent application Ser. Nos. 13/302,310, 13/247,938, 13/247,925, 13/247,919, 13/247,906, 13/247,902, 13/247,898, 13/247,895, 13/247,888, 13/247,869, 13/247,847, 13/079,681, 13/008,254, 12/946,680, 12/946,670, 12/946,657, 12/946,646, 12/946,624, 12/946,614, 12/946,557, 12/946,543, 12/946,526, 12/946,515, 12/946,495, 12/946,466, 12/946,430, 12/946,396, 12/873,962, 12/848,804, 12/646,722, 12/273,851, 12/273,785, 11/735,803, 11/734,700, 11/848,996, 11/491,742, and at USPTO-Patent Cooperation Treaty applications (PCTS) nos. PCT/US12/24018, PCT/US11/59446, PCT/US11/59437, PCT/US11/59435, PCT/US11/59427, PCT/US11/59420, PCT/US11/59415, PCT/US11/59414, PCT/US11/59403, PCT/US11/59387, PCT/US11/59385, PCT/US10/36749, PCT/US07/84343, and PCT/US07/84301, which are all incorporated by reference.

All references cited above and below herein are incorporated by reference, as well as the background, abstract and brief description of the drawings, and U.S. patent application Ser. Nos. 12/213,472, 12/225,591, 12/289,339, 12/774,486, 13/026,936, 13/026,937, 13/036,938, 13/027,175, 13/027,203, 13/027,219, 13/051,233, 13/163,648, 13/264,251, and PCT published application WO2007/110097, and U.S. Pat. Nos. 6,873,358, and RE42,898.

The following are also incorporated by reference as disclosing alternative embodiments:

U.S. Pat. Nos. 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,536,036, 7,738,015, 7,590,305, 7,352,394, 7,564,994, 7,315,658, 7,630,006, 7,440,593, and 7,317,815, and U.S. patent application Ser. Nos. 13/306,568, 13/282,458, 13/234,149, 13/234,146, 13/234,139, 13/220,612, 13/084,340, 13/078,971, 13/077,936, 13/077,891, 13/035,907, 13/028,203, 13/020,805, 12/959,320, 12/944,701 and 12/944,662, and United States published patent applications serial nos. 2012/0019614, 2012/0019613, 2012/0008002, 2011/0216156, 2011/0205381, 2012/0007942, 2011/0141227, 2011/0002506, 2011/0102553, 2010/0329582, 2011/0007174, 20100321537, 2011/0141226, 2010/0141787, 2011/0081052, 2010/0066822, 2010/0026831, 2009/0303343, 2009/0238419, 2010/0272363, 2009/0189998, 2009/0189997, 2009/0190803, 2009/0179999, 2009/0167893, 2009/0179998, 2008/0309769, 2008/0266419, 2008/0220750, 2008/0219517, 2009/0196466, 2009/0123063, 2008/0112599, 2009/0080713, 2009/0080797, 2009/0080796, 2008/0219581, 2009/0115915, 2008/0309770, 2007/0296833 and 2007/0269108.

Auto-focus features may be included in a camera or camera module as described at US published patent application no. 2012/0075492 and/or U.S. application Ser. Nos. 12/944,701, 12/944,703, 13/020,805, 13/077,891 and 13/077,936.

Features described at U.S. application Ser. Nos. 13/028,203, 13/028,205 and 13/028,206 are incorporated by reference and may also be used in alternative embodiments to register images captured that have global or local rotation between them and/or to discern the motion of the camera module and/or one or more objects in a captured scene.

It will be appreciated that the illustrated embodiment is provided for exemplary purposes only and that many variations of the implementation are possible. For example, some functionality shown as being implemented in one module could be migrated to other modules.

In the illustrated embodiment, tiles have been described as rectangular and defined by four nodes. However, it will be appreciated that although more complex, the invention could also be implemented with non-rectangular tiles defined by 3 or more nodes; and indeed the local grid need not be defined by a uniform array of tiles. Instead, these could in certain applications be non-uniform.

The invention is not limited to the embodiment(s) described herein but can be amended or modified without departing from the scope of the present invention, as set forth in the appended claims and structural and functional equivalents thereof.

What is claimed is:

1. A method for correcting distorted images, the method comprising:
    dividing an input image that contains distortions into a plurality of input tiles, each input tile having a plurality of input tile coordinates;
    for each input tile, of the plurality of input tiles, generating a corresponding output tile by:
        determining a mapping between the plurality of input tile coordinates and a plurality of output tile coordinates;

based, at least in part, on the mapping, determining corrected tile information for the input tile;
based, at least in part, on the corrected tile information, determining a minimum memory address location and a maximum memory address location of a memory space in which pixel information for the input tile is stored;
based on the minimum memory address location and the maximum memory address location, retrieving the pixel information for the input tile from the memory space;
based, at least in part, on the mapping and the pixel information of the input tile, generating corrected pixel information which does not contain one or more distortions of the distortions; and
storing the corrected pixel information in the corresponding output tile.

2. The method of claim 1, wherein the mapping is determined based on characteristics of a lens system having a wide field of view lens used to capture the input image.

3. The method of claim 1, further comprising:
modifying the minimum memory address location and the maximum memory address location of the memory space to include one or more pixels located immediately outside a boundary of the input tile in generating the corrected pixel information.

4. The method of claim 1, further comprising:
modifying the minimum memory address location and the maximum memory address location of the memory space to enable interpolation of pixels located along a boundary of the input tile in generating the corrected pixel information.

5. The method of claim 1, further comprising:
for each input tile of the plurality of input tiles:
determining an affine transformation applicable to the plurality of input tile coordinates; and
transforming the plurality of input tile coordinates onto the plurality of output tile coordinates of the corresponding output tile according to the affine transformation.

6. The method of claim 5, wherein the affine transformation comprises multiplying coordinate values u, v of each of the plurality of input tile coordinates using the following matrix transformation:

$$\begin{bmatrix} u' \\ v' \end{bmatrix} = \begin{bmatrix} a1 & a2 \\ a3 & a4 \end{bmatrix} \begin{bmatrix} u \\ v \end{bmatrix} + \begin{bmatrix} a5 \\ a6 \end{bmatrix}$$

to produce transformed coordinate values u', v' of each of the plurality of coordinates of the corresponding output tile.

7. The method of claim 1, further comprising:
determining an image acquisition focal length of a lens system with which the input image was captured; and
based, at least in part, on the image acquisition focal length, determining a global transformation to be applied to the plurality of input tile coordinates to compensate for one or more non-uniformities present in the lens system.

8. An image acquisition device comprising:
a lens and an image sensor for capturing an input image containing distortions;
a processor;
a memory for storing images;
a system bus connected to the memory; and
a distortion correction module connected to the system bus and configured to perform:
dividing the input image into a plurality of input tiles, each input tile having a plurality of coordinates;
for each input tile, of the plurality of input tiles, generating an corresponding output tile by:
determining a mapping between the plurality of input tile coordinates and a plurality of output tile coordinates;
based, at least in part, on the mapping, determining corrected tile information for the input tile;
based, at least in part, on the corrected tile information, determining a minimum memory address location and a maximum memory address location of a memory space in which pixel information for the input tile is stored;
based on the minimum memory address location and the maximum memory address location, retrieving the pixel information for the input tile from the memory space;
based, at least in part, on the mapping and the pixel information of the input tile, generating corrected pixel information which does not contain one or more distortions of the distortions; and
storing the corrected pixel information in the corresponding output tile.

9. The image acquisition device of claim 8, wherein the mapping is determined based on characteristics of a lens system having a wide field of view lens used to capture the input image.

10. The image acquisition device of claim 8, wherein the distortion correction module is further configured to perform:
modifying the minimum memory address location and the maximum memory address location of the memory space to include one or more pixels located immediately outside a boundary of the input tile in generating the corrected pixel information.

11. The image acquisition device of claim 8, wherein the distortion correction module is further configured to perform:
modifying the minimum memory address location and the maximum memory address location of the memory space to enable interpolation of pixels located along a boundary of the input tile in generating the corrected pixel information.

12. The image acquisition device of claim 8, wherein the distortion correction module is further configured to perform:
for each input tile of the plurality of input tiles:
determining an affine transformation applicable to the plurality of input tile coordinates; and
transforming the plurality of input tile coordinates onto the plurality of coordinates of the corresponding output tile according to the affine transformation.

13. The image acquisition device of claim 12, wherein the affine transformation comprises multiplying coordinate values u, v of each of the plurality of input tile coordinates using the following matrix transformation:

$$\begin{bmatrix} u' \\ v' \end{bmatrix} = \begin{bmatrix} a1 & a2 \\ a3 & a4 \end{bmatrix} \begin{bmatrix} u \\ v \end{bmatrix} + \begin{bmatrix} a5 \\ a6 \end{bmatrix}$$

to produce transformed coordinate values u', v' of each of the plurality of coordinates of the corresponding output tile.

14. The image acquisition device of claim 8, wherein the distortion correction module is further configured to perform:

determining an image acquisition focal length of a lens system with which the input image was captured; and based, at least in part, on the image acquisition focal length, determining a global transformation to be applied to the plurality of input tile coordinates to compensate for one or more non-uniformities present in the lens system.

15. A non-transitory computer-readable storage medium storing one or more instructions which, when executed by one or more processors, cause the processors to perform:

capturing an input image containing distortions;

dividing the input image into a plurality of input tiles, each input tile having a plurality of coordinates;

for each input tile, of the plurality of input tiles, generating an corresponding output tile by:

determining a mapping between the plurality of input tile coordinates and a plurality of output tile coordinates;

based, at least in part, on the mapping, determining corrected tile information for the input tile;

based, at least in part, on the corrected tile information, determining a minimum memory address location and a maximum memory address location of a memory space in which pixel information for the input tile is stored;

retrieving the pixel information for the input tile from the memory space;

based, at least in part, on the mapping and the pixel information of the input tile, generating corrected pixel information which does not contain one or more distortions of the distortions; and storing the corrected pixel information in the corresponding output tile.

16. The non-transitory computer-readable storage medium of claim 15, wherein the mapping is determined based on characteristics of a lens system having a wide field of view lens used to capture the input image.

17. The non-transitory computer-readable storage medium of claim 15, further comprising additional instructions which, when executed by the one or more processors, cause the processors to perform:

modifying the minimum memory address location and the maximum memory address location of the memory space to include one or more pixels located immediately outside a boundary of the input tile in generating the corrected pixel information.

18. The non-transitory computer-readable storage medium of claim 15, further comprising additional instructions which, when executed by the one or more processors, cause the processors to perform:

modifying the minimum memory address location and the maximum memory address location of the memory space to enable interpolation of pixels located along a boundary of the input tile in generating the corrected pixel information.

19. The non-transitory computer-readable storage medium of claim 15, further comprising additional instructions which, when executed by the one or more processors, cause the processors to perform:

for each input tile of the plurality of input tiles:

determining an affine transformation applicable to the plurality of input tile coordinates; and transforming the plurality of input tile coordinates onto the plurality of coordinates of the corresponding output tile according to the affine transformation.

20. The non-transitory computer-readable storage medium of claim 19, wherein the affine transformation comprises multiplying coordinate values u, v of each of the plurality of input tile coordinates using the following matrix transformation:

$$\begin{bmatrix} u' \\ v' \end{bmatrix} = \begin{bmatrix} a1 & a2 \\ a3 & a4 \end{bmatrix} \begin{bmatrix} u \\ v \end{bmatrix} + \begin{bmatrix} a5 \\ a6 \end{bmatrix}$$

to produce transformed coordinate values u', v' of each of the plurality of coordinates of the corresponding output tile.

21. The non-transitory computer-readable storage medium of claim 15, further comprising additional instructions which, when executed by the one or more processors, cause the processors to perform:

determining an image acquisition focal length of a lens system with which the input image was captured; and based, at least in part, on the image acquisition focal length, determining a global transformation to be applied to the plurality of input tile coordinates to compensate for one or more non-uniformities present in the lens system.

* * * * *